United States Patent [19]

Uehara

[11] Patent Number: 4,961,177

[45] Date of Patent: Oct. 2, 1990

[54] METHOD AND APPARATUS FOR INPUTTING A VOICE THROUGH A MICROPHONE

[75] Inventor: Kensuke Uehara, Tokyo, Japan

[73] Assignee: Kabushiki Kaisha Toshiba, Kawasaki, Japan

[21] Appl. No.: 302,264

[22] Filed: Jan. 27, 1989

[30] Foreign Application Priority Data

Jan. 30, 1988 [JP] Japan .................................. 63-20291

[51] Int. Cl.5 ......................... H04B 1/00; H04B 11/00

[52] U.S. Cl. .................................... 367/197; 367/118; 367/198; 379/167; 381/42; 381/43; 382/2; 340/825.31; 340/825.34

[58] Field of Search ....................... 340/825.31, 825.34; 187/121, 126, 132; 367/118, 119, 197, 198; 358/85, 105, 125; 364/513, 513.5; 379/53, 103, 167; 381/26, 41, 42, 43, 110, 168, 169, 124; 382/1, 2, 5, 16, 18

[56] References Cited

U.S. PATENT DOCUMENTS

| | | | |
|---|---|---|---|
| 3,688,267 | 8/1972 | Iijima et al. . | |
| 4,445,229 | 4/1984 | Tasto et al. | 381/110 |
| 4,449,189 | 5/1984 | Feix et al. | 364/513.5 |
| 4,472,617 | 9/1984 | Ueda et al. . | |
| 4,558,298 | 12/1985 | Kawai et al. . | |
| 4,769,845 | 9/1988 | Nakamura | 381/43 |

OTHER PUBLICATIONS

Vol. 87, No. 71 (P10) (IEICE Technical Report) Sep. 5, 1988, (The Detection of Mouth's is written in this report).

*Primary Examiner*—Donald J. Yusko
*Assistant Examiner*—Dervis Magistre
*Attorney, Agent, or Firm*—Cushman, Darby & Cushman

[57] ABSTRACT

An apparatus and method for inputting a voice through a microphone mounted at a position facing a speaking person. An image of a speaking person is generated and used to detect the position of a mouth of the speaker. The microphone is then moved in accordance with position of the mouth.

23 Claims, 2 Drawing Sheets

METHOD AND APPARATUS FOR INPUTTING A VOICE THROUGH A MICROPHONE

BACKGROUND OF THE INVENTION

1. Field of the Invention

This invention relates to a voice input method and apparatus which provides a reliable voice input through a microphone for recognition of voice commands even though the microphone is mounted at a distance.

2. Description of The Related Art

Various systems have been developed, employing voice recognition, to monitor and control entry into and exit from motor vehicles, elevators, and important facilities (see, for example, U.S. Pat. Nos. 4,558,298 and 4,450,545). Such systems are intended to eliminate the inconvenience of prior gate or door open/close control systems which employ keys or ID (identification) cards (e.g., necessity of carrying a key or an ID card at all times and poor operability of the key or ID card sets). Further, such systems are intended to open or close a gate (door) by recognizing a voice command (e.g., an ID number) from the speech of a person, or by identifying the person from characteristics of the input speech. Such systems based on voice recognition are very satisfactory, because each person does not need to carry his key or ID card at all times and the person can be identified with high accuracy by his voice.

For accurate voice recognition, however, a voice must be collected at a high signal-to-noise ratio without contamination of ambient noise. Conventionally, a handset type microphone or close range microphone was used to avoid possible noise contamination. Either of these microphones may collect speech at a very close position to the mouth of a speaking person and achieve a desired high S/N ratio of input speech. These microphones, however, require a person to hold them during speaking, resulting in impaired operability.

To collect only desired voice sounds, the use of soundproof walls or sharp directional microphones has been considered for cutting off ambient noise. However, soundproof walls may be very expensive and the voice input apparatus may be rendered inappropriate for many uses. When a sharp directional microphone is employed, if the directional reception sector for the microphone deviates slightly from the direction toward the speaking person's mouth, it might collect a large amount of ambient noise together with desired speech, thereby reducing the S/N ratio drastically.

As is obvious from the foregoing, the related voice input apparatus based on voice recognition technology still have many problems. Remaining unsolved, until this invention, is the problem of how a person's speech can be collected at a high S/N ratio without impairing the usefulness and operability of the voice input apparatus.

SUMMARY OF THE INVENTION

Accordingly, it is an object of the present invention to provide a voice input apparatus and method which can collect voice data from a person at a high S/N ratio without impairing the usefulness and operability of the voice input apparatus.

In accordance with the present invention, the foregoing object, among others, is achieved by providing an apparatus and method for inputting a voice through a microphone mounted at a position facing a speaking person. An image of the speaking person is generated and employed to detect the position of the mouth of the person. Then, the microphone can be moved automatically in accordance with the position of the mouth of the speaker.

Preferably, the direction of the microphone toward the mouth is determined based on the position of the mouth in relation to the mounting position of the microphone.

BRIEF DESCRIPTION OF THE DRAWINGS

A more complete appreciation of the present invention and many of its attendant advantages will be readily obtained by reference to the following detailed description considered in connection with the accompanying drawings, in which.

DETAILED DESCRIPTION OF THE PREFERRED EMBODIMENTS

One of the preferred embodiments of the present invention will be described with reference to the accompanying drawings.

Figure 1:
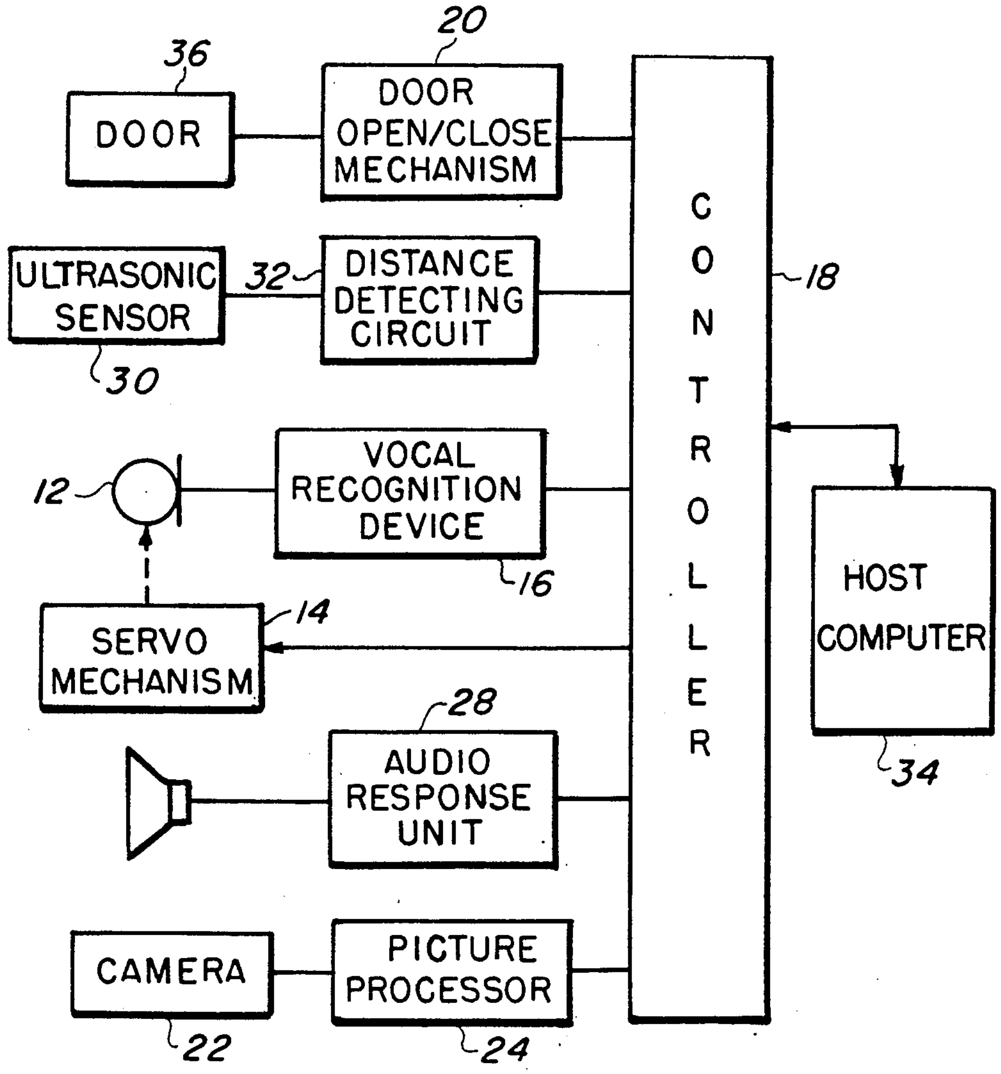
FIG. 1 is a schematic block diagram of the voice input apparatus according to one embodiment of the present invention.
Figure 2:
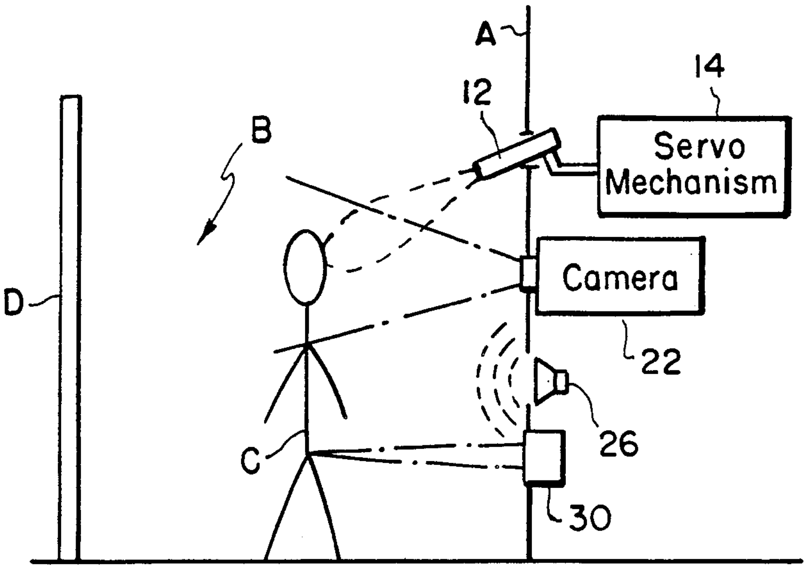
FIG. 2 is a schematic illustration for showing the operation thereof.

FIG. 1 is a schematic block diagram of the voice input apparatus according to one embodiment of the present invention. FIG. 2 is a schematic illustration for showing the operation thereof. The apparatus may be introduced into a system which opens or closes a door and monitors all persons passing through the door by speech and/or voice recognition technology. It should be obvious that the apparatus is applicable to vending machines, auto tellers' machines and any other apparatus using speech and/or voice input and speech recognition technology.

Referring to FIGS. 1 and 2, a microphone 12 used herein has sharp unidirectional characteristics. The microphone 12 is supported by a servomechanism (moving means) 14 for positioning the microphone 12. The servomechanism is mounted to the upper portion of a wall A. The servomechanism 14 operates to adjust the direction of the microphone 12 within a range which covers the voice input area B in front of the wall A in accordance with a well known technique. Speech collected through the microphone 12 is transmitted to a vocal recognition device 16 for speech and/or voice recognition processing. For this recognition processing, one possible technique is disclosed in U.S. Pat. No. 3,688,267. The resulting data from the vocal recognition device 16 is then transmitted to a controller 18 for opening or closing the door, which is driven by a door open/close mechanism 20. This door open/close mechanism 20 may be as described in U.S. Pat. No. 4,472,617, etc.

Figure 3:
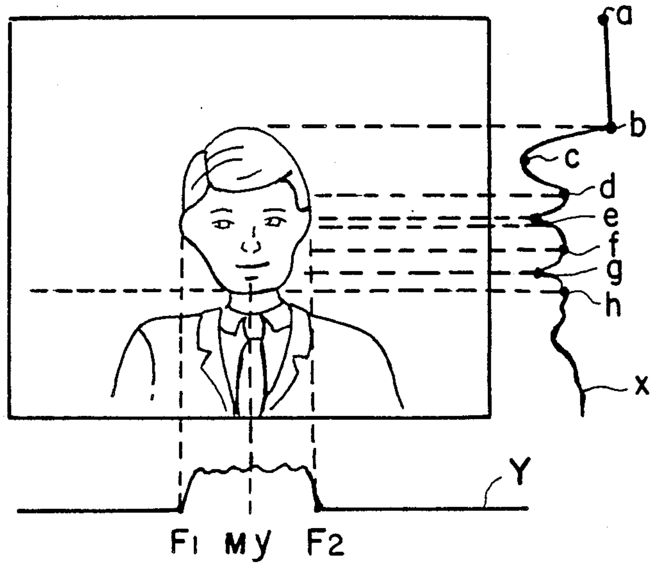
FIG. 3 is an explanatory illustration for detection of the person's mouth position through picture processing.

On the wall A, a camera (picking up means) 22 is provided for picking up an image of a person C who enters the voice input area B to speak. The image of the person C is picked up as shown in FIG. 3. The image of the person C picked up by the camera 22 is processed by a picture processor (detecting means) 24 to obtain information relating to the position of the person's mouth. This technique is disclosed in IEICE Technical Report Vol. 87, No. 71, pp. 7–12. Positional information for the mouth is supplied to the controller (determining means) 18 for determining the direction of the microphone 12. It should be appreciated that a panel D is provided behind the voice input area B at the opposite side of wall A. The panel D prevents the camera 22 from picking up undesired background noise from behind the person C. It should be further appreciated that the panel D may be omitted since the image of the person C can be discriminated from the background when the background is outside of the depth of focus of the lens system of the camera 22 when the lens system is focused on person C.

A speaker 26 embedded in the wall A produces audio messages from the system to the person C. An audio response unit 28 activated by the controller 18 synthesizes aural signals by a well known synthesis-by-rule method according to message information submitted by the system and drives the speaker 26 to produce suitable audio messages.

An ultrasonic sensor 30 is also mounted on the wall A under the speaker 26. The ultrasonic sensor 30 is energized by a distance detecting circuit 32 to transmit ultrasonic waves at the person C. The distance detecting circuit 32 measures the period of time from wave transmission to reception of reflected waves at the ultrasonic sensor 30 to detect the distance between the wall A and the person C entering the voice input area B. The distance information detected by the distance detecting circuit 32 is also supplied to the controller 18 for controlling the directional adjustment of the microphone 12.

The controller 18 is connected to a host computer 34. The host computer 34 matches the output data of the speech or voice recognition device 16 with the previously registered management data such as a person's ID number. In addition, the host computer 34 also generates response messages for each speech input and guidance messages to be given to the person C.

The above configuration of the present invention provides the following operation. Control of the direction of the microphone 12, is one of the distinctive features of the present apparatus and is accomplished, as described above, according to positional information for the mouth which is obtained from the person's image picked up by the camera 22, the distance information detected by means of the ultrasonic sensor 30, and the mounting position information for the microphone 12.

The picture processor 24 eliminates the background information from the picture signals transmitted from the camera 22 and provides horizontal projection X of the image of the person C as shown in FIG. 3. The components a, b, ...,h of the projection X are scanned. Scanning first occurs from top a to a point b in FIG. 3 where luminance first changes. The point b where luminance first changes is considered the top of the person's head. Luminance changes of the projection X are further scanned to determine that the component d shows the forehead portion, the component e shows the eye portion, the component g shows the mouth portion, and the component h shows the neck portion. These determinations can be made because the luminance of the hair (head) portion, the eye portion, and the mouth portion are largely different as compared with the skin portion where the luminance is almost uniform. The vertical component Mx of the mouth position in the person's image can be detected from the relation between the difference in luminance and the detected position.

Then, the horizontal luminance change Y in the face image detected above is determined to locate the position of each ear in the image and calculate horizontal components F1 and F2 of the face position of the person C. The horizontal component My of the mouth position is calculated from the horizontal components F1 and F2 by the equation:

$$My=(F1+F2)/2$$

After the position of the person's mouth in the image picked up by the camera 22 is obtained, the mouth position in the three-dimensional voice input area B is calculated from the optical system position defined by the lens system of the camera 22 and the distance information to the person C detected by means of the ultrasonic sensor 30. The optimal direction of the microphone 12 toward the mouth of the person C in the three-dimensional space (relative angle) is calculated from the positional information of the mouth and the positional information of the microphone 12. The microphone driving servomechanism 14 is driven to adjust the direction of the microphone 12 so that it corresponds to the calculated direction.

As a result, the microphone 12 is directed toward the mouth of the person C and the speech from the person C can be collected at a high S/N ratio.

In the operation of the gate entrance/exit control system which employs the present apparatus, the system first detects the entrance of a person into the voice input area B by the ultrasonic sensor 30 as described above. The present apparatus is activated by the detection signal of the person C.

The audio response unit 28 is then activated and through speaker 26 issues to person C the audio message: "Please face the camera." The camera 22 picks up the image of the person C facing the camera. At the same time, the distance to the person C is calculated by means of reflected ultrasonic waves activated by the ultrasonic sensor 30. Then the mouth position of the person C is calculated as described above to determine the direction of the microphone 12 toward the mouth.

After these procedures, the system is ready for voice input and issues to the person C the audio message:

"Please say your ID number."

Speech of the person C is collected by the microphone 12. The vocal signal collected by the microphone 12 is processed by the vocal recognition device 16 so that the recited ID number is made machine-readable. The processed data is sent to the host computer 34 through the controller 18.

If the speech is not recognized properly, the system issues to the person C the message:

"Please say your ID number again clearly digit by digit."

to ask for reentry of the ID number and the second speech is again processed by the vocal recognition device 16.

The recognized ID number is compared with previously registered management data to determine whether the person C should be admitted into the facility. When the person C is found to be admittable, the door open/close mechanism 20 is driven to open the door with the message issued:

"The door will open. Please come in."

When the person C is not found to be admittable, the system issues to the person C the message:

"Your ID number is not found. The door will not open."

A sequence of processes of the system is completed with one of these messages.

It should be apparent to those skilled in the art that individual identification of the person may also be accomplished by extracting personal characteristics of the input voice pattern during the speech recognition process. This may be done in lieu of, or in combination with the speech recognition method.

According to the present apparatus, the microphone 12 with a sharp directivity can be effectively directed toward the mouth of the person C, thereby resulting in reliable collection of the speech made by the person at a high S/N ratio. The sharply directional microphone 12 used herewith can be provided at a distance from the person C without any loss in S/N ratio. Consequently, the person can speak unaffected by the presence of the microphone 12, and the person will not feel that he is forced to speak to the system. In addition, even when both hands are occupied, easy entry of an ID number or any other information can be achieved by speaking.

By setting a person at ease during speaking, a better reflection of personal characteristics in the input voice and enhanced accuracy for individual identification can be expected.

It should be understood that the present invention is not limited to the aforementioned embodiment. In the foregoing, the present invention has been described in conjunction with an entrance/exit control system through door open/close control, but it should be further understood that the present invention may be applicable to other systems based on voice input technology. The picture processing used herewith is not limited to a particular type and the picture processing may also be used to calculate the distance to the person C, (see, e.g., Japan patent application No. 62-312192), which will eliminate the distance calculating process with ultrasonic waves.

Moreover, it should be also understood that various modifications to the present invention will be apparent to those skilled in the art without departing from the spirit and scope of the invention. Such modifications are intended to be included in this application as defined by the following claims.

What is claimed is:

1. An apparatus for inputting a voice through a microphone mounted at a position facing to a speaking person, comprising:

image pick-up means for picking up an image of the speaking person;

means for detecting the position of a mouth of the person from the image picked up by the picking up means; and means for moving the microphone in accordance with the position of the mouth detected by the mouth detecting means.

2. The apparatus of claim 1, further comprising means for determining a direction of the microphone toward the mouth based on a position of the mouth detected by the detecting means and the mounting position of the microphone, the moving means being responsive to the determining means.

3. The apparatus of claim 2, further comprising means for sensing a distance between the speaking person and a reference location, the determining means determining a direction toward the mouth also based on the distance sensing means.

4. The apparatus of claim 3, wherein the distance sensing means includes an ultrasonic distance sensor.

5. The apparatus of claim 1 further comprising a panel, the speaking person being positioned between the image pick-up means and the panel for the screening of background imagery and noise.

6. The apparatus of claim 1 further comprising means for issuing audible commands to the speaking person so that the speaking person may issue a response to said commands.

7. An apparatus for authorizing access comprising:

a microphone mounted at a position facing a speaking person seeking access;

means for picking up an image of the speaking person;

means for detecting the position of a mouth of the speaking person from the image picked up by the picking up means;

means for moving the microphone in accordance with the position of the mouth detected by the mouth detecting means; and means, responsive to an output of the microphone, for generating an access signal when the output of the microphone is detected as being generated in response to an authorized person.

8. The apparatus of claim 7, further comprising means for determining a direction of the microphone toward the mouth based on a position of the mouth detected by the detecting means and the mounting position of the microphone, the moving means being responsive to the determining means.

9. The apparatus of claim 7, further comprising means for sensing a distance between the speaking person and a reference location, the determining means determining a direction toward the mouth also based on the distance sensing means.

10. The apparatus of claim 9, wherein the distance sensing means includes an ultrasonic distance sensor.

11. The apparatus of claim 7, further comprising a panel, the speaking person being positioned between the image pick-up means and the panel for the screening of background imagery and noise.

12. The apparatus of claim 7 further comprising means for issuing audible commands to the speaking person so that the speaking person may issue a response to said commands.

13. The apparatus of claim 7 wherein said microphone is a highly directional microphone.

14. A method for inputting a voice through a microphone mounted at a position facing a speaking person, comprising the steps of:

generating an image signal related to an image of the speaking person;

generating a position signal related to the position of a mouth of the person based on the image signal; and moving the microphone in accordance with the position signal indicating the position of the mouth.

15. The method of claim 14, further comprising the step of generating a direction signal related to a direction of the microphone toward the mouth based on the position signal and the mounting position of the microphone, the moving step being responsive to the direction signal.

16. The method of claim 15, further comprising the step of generating a distance signal related to a distance between the speaking persons and a reference location, the direction signal generating step determining a direction toward the mouth also based on the distance signal.

17. The method of claim 14, further comprising the step of positioning the speaking person in front of a panel for the screening of undesired background noise from said image signal.

18. The method of claim 14, further comprising the step of issuing audible commands to the speaking person so that the speaking person may issue a response to said commands.

19. A method for authorizing access comprising:
generating an image signal related to an image of a speaking person;
generating a position signal related to the position of a mouth of the speaking person based on the image signal;
moving a microphone in accordance with the position signal indicating the position of the mouth;
monitoring an output of the microphone; and
generating an access signal when the output of the microphone is detected as being generated in response to an authorized person.

20. The method of claim 19, further comprising the step of generating a direction signal related to a direction of the microphone toward the mouth based on the position signal and the mounting position of the microphone, the moving step being responsive to the direction signal.

21. The method of claim 20, further comprising the step of generating a distance signal related to a distance between the speaking person and a reference location, the direction signal generating step determining a direction toward the mouth also based on the distance signal.

22. The method of claim 19 further comprising the step of positioning the speaking person in front of a panel for the screening of undesired background noise from said image signal.

23. The method of claim 19 further comprising the step of issuing audible commands to the speaking person so that the speaking person may issue a response to said commands.

* * * * *